United States Patent
Morales

(10) Patent No.: US 11,196,878 B1
(45) Date of Patent: Dec. 7, 2021

(54) PRINTING SYSTEM AND METHODS USING A MOBILE USER INTERFACE WITH A PRIMARY USER INTERFACE AT A PRINTING DEVICE

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/088,914

(22) Filed: Nov. 4, 2020

(51) Int. Cl.
*G06F 3/12* (2006.01)
*H04N 1/00* (2006.01)

(52) U.S. Cl.
CPC ..... *H04N 1/00307* (2013.01); *H04N 1/00424* (2013.01); *H04N 1/00427* (2013.01); *H04N 1/00477* (2013.01)

(58) Field of Classification Search
None
See application file for complete search history.

(56) References Cited

U.S. PATENT DOCUMENTS

| | | | |
|---|---|---|---|
| 8,237,940 B2 | 8/2012 | Conescu et al. | |
| 10,346,103 B2 | 7/2019 | Haas et al. | |
| 2007/0066290 A1* | 3/2007 | Silverbrook | H04M 1/21 455/418 |
| 2007/0066341 A1* | 3/2007 | Silverbrook | G06Q 20/382 455/550.1 |
| 2013/0111238 A1* | 5/2013 | Takahashi | H04N 1/00204 713/320 |
| 2015/0169197 A1* | 6/2015 | Muto | G06F 3/0481 715/798 |
| 2015/0193674 A1* | 7/2015 | Ishiguro | G06F 3/1253 358/1.15 |
| 2015/0264220 A1* | 9/2015 | Tsukada | H04N 1/00498 358/1.13 |
| 2015/0355787 A1* | 12/2015 | Clay | G06F 3/0219 715/734 |
| 2015/0381829 A1* | 12/2015 | Sakayama | H04N 1/00103 358/1.15 |
| 2016/0105484 A1 | 4/2016 | Haas et al. | |
| 2016/0150104 A1* | 5/2016 | Wagatsuma | G06F 3/1294 358/1.15 |
| 2017/0264758 A1* | 9/2017 | Naito | H04W 12/50 |
| 2019/0364169 A1* | 11/2019 | Iida | H04N 1/32662 |
| 2020/0084321 A1* | 3/2020 | Umeda | H04N 1/00037 |

* cited by examiner

*Primary Examiner* — Henok Shiferaw
(74) *Attorney, Agent, or Firm* — Millen, White, Zelano & Branigan, P.C.; William Nixon

(57) ABSTRACT

A printing system includes a printing device having different modules with components. A mobile device exchanges information and data with the printing device. The mobile device includes a mobile user interface that corresponds to a primary user interface supported by the printing device, such as on a display panel. Elements of an operation shown by primary user interface are tagged and exported to the mobile device. The mobile user interface is configured according to the elements to allow completion of the operation using the mobile device.

20 Claims, 5 Drawing Sheets

PRINTING SYSTEM AND METHODS USING A MOBILE USER INTERFACE WITH A PRIMARY USER INTERFACE AT A PRINTING DEVICE

FIELD OF THE INVENTION

The present invention relates to a printing system having a printing device with a primary user interface that interacts with a mobile user interface to perform operations at the printing device.

DESCRIPTION OF THE RELATED ART

Unlike office printing devices, production printing devices may be quite long and require additional space to operate. Some production printing devices may be dozens, if not hundreds, of feet in length. During the normal course of operation of the printing device, an operator may have to walk back and forth between a printing device module and the user interface for the printing device. For example, when the operator loads paper in a tray, he/she typically validate that the paper is the same or new paper attributes need to be selected for the tray. Similarly, the operator may be instructed to clear paper jams, replace consumables, such as staples, adjust module settings, such as adjusting paper feeder settings to alleviate paper jamming, or perform maintenance in modules other than the main unit. The operator may have to go back and forth to a panel to perform these tasks. The panel may be dozens of feet away from the area where the operator is working.

The larger the production printing device, the more efficient the process becomes. Some production printing devices may include a remote panel that duplicates the functionality of the printing device. The remote panel, however, may require a laptop or tablet. Neither of these items are ideal for the operator to carry while performing tasks, especially if the operator must open modules to clear jams, check equipment, or perform other operations.

SUMMARY OF THE INVENTION

A method for using a mobile user interface with a primary user interface for printing device is disclosed. The method includes enabling the primary user interface at a panel at the printing device. The method also includes logging components of the printing device with the primary user interface. The method also includes displaying an operation to complete at the printing device in the primary user interface. The method also includes identifying a plurality of elements of the primary user interface related to the operation to complete. The operation correlates to the plurality of elements of the primary user interface. The method also includes exporting the plurality of elements to a mobile device connected to the printing device. The mobile device includes the mobile user interface. The method also includes configuring the mobile user interface according to the plurality of elements exported from the primary user interface. The method also includes sending a notification to the mobile user interface corresponding to the operation. The method also includes displaying a message in response to the notification within the mobile user interface. The method also includes engaging the mobile user interface to indicate that the operation is complete on the printing device.

A method for performing operations at a printing device is disclosed. The method includes registering a mobile device with the printing device. The method also includes identifying a plurality of elements within a primary user interface running on a panel at the printing device. The plurality of elements relates to tasks to complete on the printing device. The method also includes exporting the plurality of elements to a mobile user interface on the mobile device. The method also includes configuring the mobile user interface according the plurality of elements. Information displayed by the mobile user interface corresponds to the plurality of elements from the primary user interface. The method also includes receiving a notification at the mobile device from the printing device. The method also includes prompting a task to complete at the printing device using the mobile user interface based on the notification. The method also includes receiving an input at the mobile user interface regarding the task. The method updating the primary user interface based on the input.

A printing system is disclosed. The printing system includes a printing device having a panel for a primary user interface. The primary user interface displays a plurality of elements related to an operation to complete on the printing device. The printing system also includes a mobile device connected to the printing device. The mobile device includes a mobile application to support a mobile user interface. The primary user interface is configured to export the plurality of elements identified by the primary user interface to the mobile user interface. The mobile user interface is configured to display messages on the mobile device that correspond to the plurality of elements from the primary user interface. The mobile user interface is configured to receive a notification at the mobile device from the printing device. The mobile user interface also is configured to prompt a task to complete at the printing device using the mobile user interface based on the notification. The mobile user interface also is configured to receive an input at the mobile user interface regarding the task. The mobile user interface also is configured update the primary user interface based on the input.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments provide a supplementary, or mobile, user interface that compliments the panel, or primary, user interface at a production printing device. Unlike a remote panel system, the disclosed mobile user interface would export minimal and contextual information. Specifically, the primary user interface on the panel would export operator messages, which may include action buttons to engage the operator. No other user interface elements would be exported to the mobile user interface. The feature of exporting select information and action buttons to a mobile user interface gives the operator the ability to dismiss confirmation dialogs, change simple settings, or resume printing without having to walk back to the panel of the printing device.

Unlike fully remote user interface solutions, the mobile user interface of the disclosed embodiments is specifically designed to work with mobile devices with small screens. The disclosed embodiments are focused on streamlining interactions with the printing device panel that would require the operator to walk back and forth between a module and the main unit of the printing device. This feature should allow operators to be more efficient as they can readily dismiss dialogs, make selections, and confirm operations being completed wherever they may be located.

The greater benefit of the disclosed embodiments will be seen in large production printing devices. A printing device having a base configuration of one feeder and one finisher may not receive much value from the disclosed embodiments. A tandem configuration, however, of two printing units with three feeders and two stackers and a finisher may find that the disclosed system significantly reduces the time to perform certain operator tasks. Larger printing devices would see the most benefits. This is especially significant on large production printing devices, which can be over 10 meters in length or two stories tall. The time to walk between a module of the printing device and a panel executing the primary user interface may be considerable.

Figure 1:
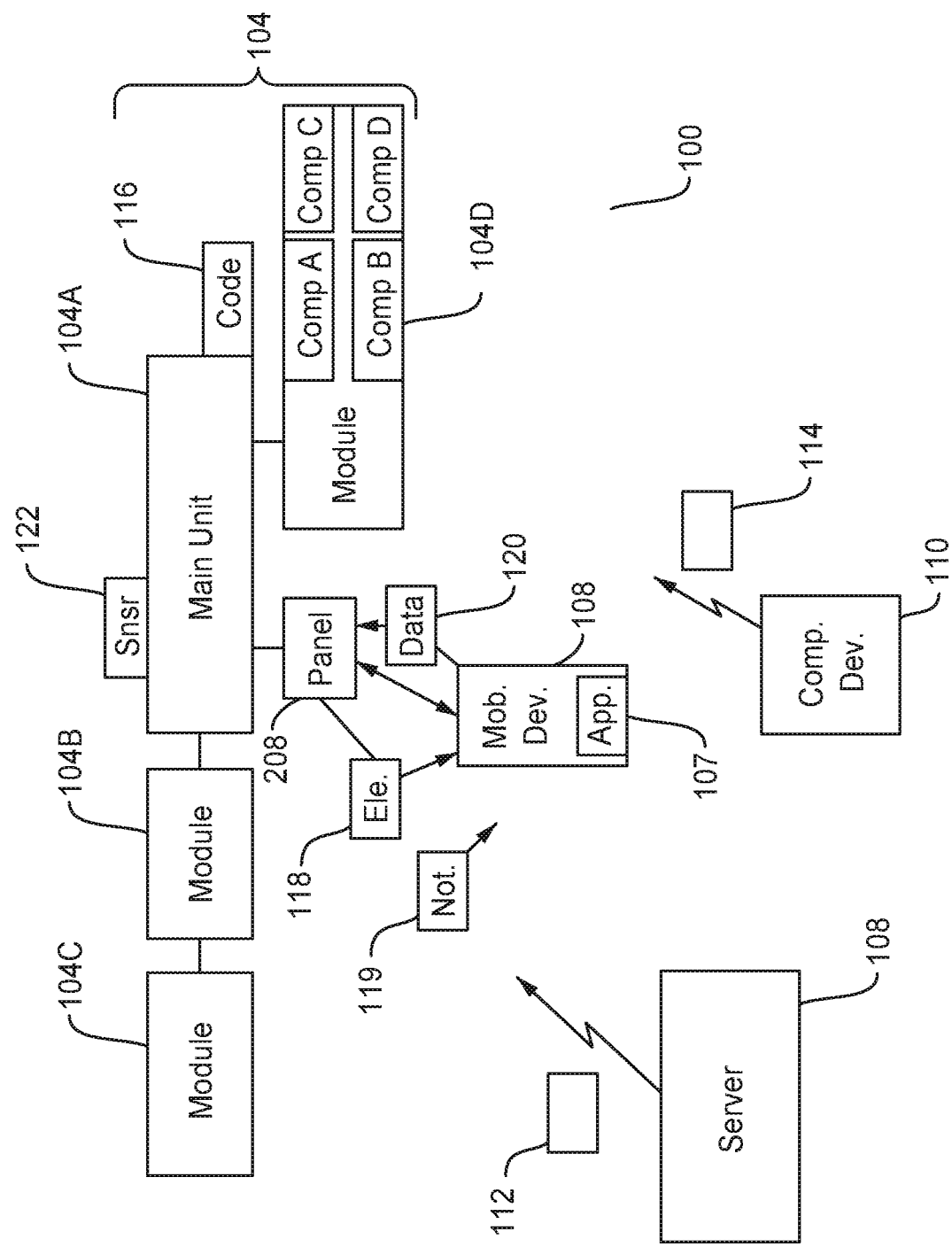
FIG. 1 illustrates a block diagram of a printing system having a printing device and a mobile device according to the disclosed embodiments.

FIG. 1 depicts a printing system 100 having a printing device 104 and a mobile device 106 according to the disclosed embodiments. Printing device 104 may be a production printing device having more than one module or component. Some components of printing device 104 are disclosed below in FIG. 2. Printing device 104 includes main unit 104A. Main unit 104A includes panel 208. Main unit 104A is connected to modules 104B, 104C, and 104D. Modules 104B, 104C, and 104D may perform functions as instructed by main unit 104A. Further, an operator may have to service components within a module, such as module 104C, that is not in close proximity to main unit 104A. Module 104C may be located a few dozen feet from main unit 104A. Module 104D may be located on another level than main unit 104A. For example, module 104D may be located above main unit 104A such that an operator must climb stairs to access the module. Thus, access to panel 208 during maintenance tasks or operations may not be available when servicing modules 104C and 104D.

Printing device 104 is connected to other devices within printing system 100. Mobile device 106 may be connected to printing device 104 to enable a mobile user interface based on a primary user interface displayed on panel 208. The mobile user interface and the primary user interface are disclosed in greater detail below. Mobile device 106 includes mobile application 107 that communicates with printing device 104. Mobile application 107 may receive information from printing device 104 to configure an applicable mobile user interface. Preferably, elements 118 of the primary user interface on panel 208 and managed by main unit 104A are provided to mobile application 107. Mobile application 107 uses elements 118 to configure the mobile user interface corresponding to printing device 104. As the operator inputs responses to the mobile user interface, mobile device 106 may send data 120 to printing device 104 to indicate a status of a module or component of the printing device or that a task is completed.

Mobile device 106 may connect to printing device 104 over a local network or using a short-range communication protocol, such as a near-field communication (NFC) protocol, Bluetooth™ connection, Wi-Fi Direct, and the like. In some embodiments, mobile device 104 may scan a code 116 at printing device 104 to connect the devices. Mobile application 107 may use the scanned code to send a request to printing device 104 to send messages and notifications to mobile device 106. Code 116 may be a Quick Response (QR) code or other graphic that uniquely identifies printing device 104 and provides the information needed to link mobile device 106 thereto. Alternatively, code 116 may be another identifier. In other embodiments, the operator may enter code 116 into mobile application 107 to pair mobile device 106 with printing device 104. The operator also may open a mobile single page application (SPA) that is updated dynamically by printing device 104.

With printing device 104 identified by code 116, mobile application 107 may exchange information and data with panel 208 or other components of the printing device. Mobile application 107 will receive notifications 119 from panel 208 or printing device 104. Notifications 119 may include instructions to the user through mobile application 107 or its mobile user interface. These instructions may correspond to operations to be completed on printing device 104. Notifications 119 also may include information about the status of printing device 104 or modules 104A-D. The user of mobile device 106 may respond via the mobile user interface to notifications 119 such that data 120 is sent to printing device 104 that an operation or task is complete.

The primary user interface on panel 208 may be adapted to identify information that may be sent to mobile device 106. This information may be shown as elements 118 in FIG. 1. Elements 118 serve to configure the mobile user interface on mobile device 106 or within mobile application 107. This feature may be accomplished by having printing device 104 provide a mobile version of its user interface with a minimal set of elements to mobile device 106 when the connection between the devices is established. According to these embodiments, the mobile version of the user interface may be stored at printing device 104. Upon detection or synchronization with mobile device 106, printing device 104 may push elements 118 to the mobile device.

In other embodiments, elements 118 of the user interface may be tagged as exportable. The tagged elements are pushed to mobile device 106 to configure the mobile user interface using mobile application 107. The elements may be tagged after the connection is established between mobile device 106 and printing device 104. The user may tag elements 118 using panel 208 with the primary user interface. Alternatively, printing device 104 may execute a process to tag elements based on instructions provided by the user for operations to be accomplished either through panel 208 or mobile application 107. Other embodiments include an implementation that would not require a mobile-specific user interface. This implementation may provide a mechanism for pushing elements 118 from any user interface to mobile device 106.

In some embodiments, printing device 104 may include one or more sensors 122 that detect mobile devices that are nearby. Upon detection, mobile device 106 may launch mobile application 107 or a mobile webpage that may export tagged elements 118 to mobile device 106 to build the mobile user interface. Printing device 104 also may use detection by sensor 122 to provide device information to establish the connection with mobile device 106.

During normal operations, the user moves about printing device 104. The user is not necessarily located near panel 208 to confirm completion of tasks or receive messages displayed therein. The user may be asked to perform a task someplace away from main unit 104A and panel 208. Mobile device 106 along with mobile application 107 provides a mobile user interface that allows the user to confirm completion of tasks, receive messages, view overall operation procedures, and interact with printing device 104 without the need to return to panel 208. Further, extra panels or interfaces need not be provided on printing device 104 as mobile device 106 can perform these functions.

When the user performs an operation that requires input or confirmation, system 100 will display not only the usual, or primary, user interface in panel 208 but it will also send a message or notification 119 to registered mobile device 106. The message sent to mobile device 106 would depend on the exact message. The message may include an action button or other feature that requires input from the user to complete the task or operation. The action button may be displayed on mobile device 106. The user engages the action button to send data 120 to printing device 104 that the action is completed.

An example of how the mobile user interface may be used is if the user opens and closes a tray, such as to load paper. System 100 or printing device 104 will instruct the user interfaces to show a prompt asking the user to confirm tray settings. For example, the tray may be located in module 104D. The user should confirm the settings while there as opposed to going back to panel 208 than having to return to do the confirmation back at the module. The user can confirm settings using the mobile user interface on mobile device 106 and the primary user interface on panel 208 would dismiss the matching dialog. Alternatively, the user may change the paper settings for the tray and then confirm these changes.

Another example may be system 100 sends a prompt as notification 119 to mobile device 106 after the user clears a paper jam in module 104B. The prompt allows the user to verify that it is acceptable to resume printing. After the user replaces a consumable, such as a staple cartridge, waste bottle, and the like, system 100 may provide confirmation buttons in the mobile user interface that the user can use to resume printing. If there is a problem printing the current print job, printing device 104 through panel 208 may send a forcible continuation prompt to mobile device 106 to alert the user and ask for a response in order to continuation operations. The user then may choose to either cancel or continue the print job using the mobile user interface. Printing operations may be stopped using mobile device 106.

System 100 also includes server 108 and computing device 110. These devices may exchange data with mobile device 106 as well as printing device 104. Server 108 may be instructed to send print job 112. For example, server 108 may store a document that is to be printed on printing device 104. It receives an instruction from another device within system 100, such as mobile device 106 or computing device 110, to print the document. Print job 112 is generated to print the document. Computing device 110 may generate print job 114 for processing at printing device 104. Computing device 110 is attached to a network for system 100.

Print jobs 112 and 114 may be more than one document. These print jobs may be large in scale so that a production printing device is required. Upon receipt of a print job, printing device 104 may inform the primary user interface to tag elements to push to mobile device 106. The elements configure the mobile user interface in response to incoming print job so that the user can view progress of completion of the print job. The mobile user interface also may provide messages in the form of action buttons to have the user confirm progression of the print job.

Figure 2:
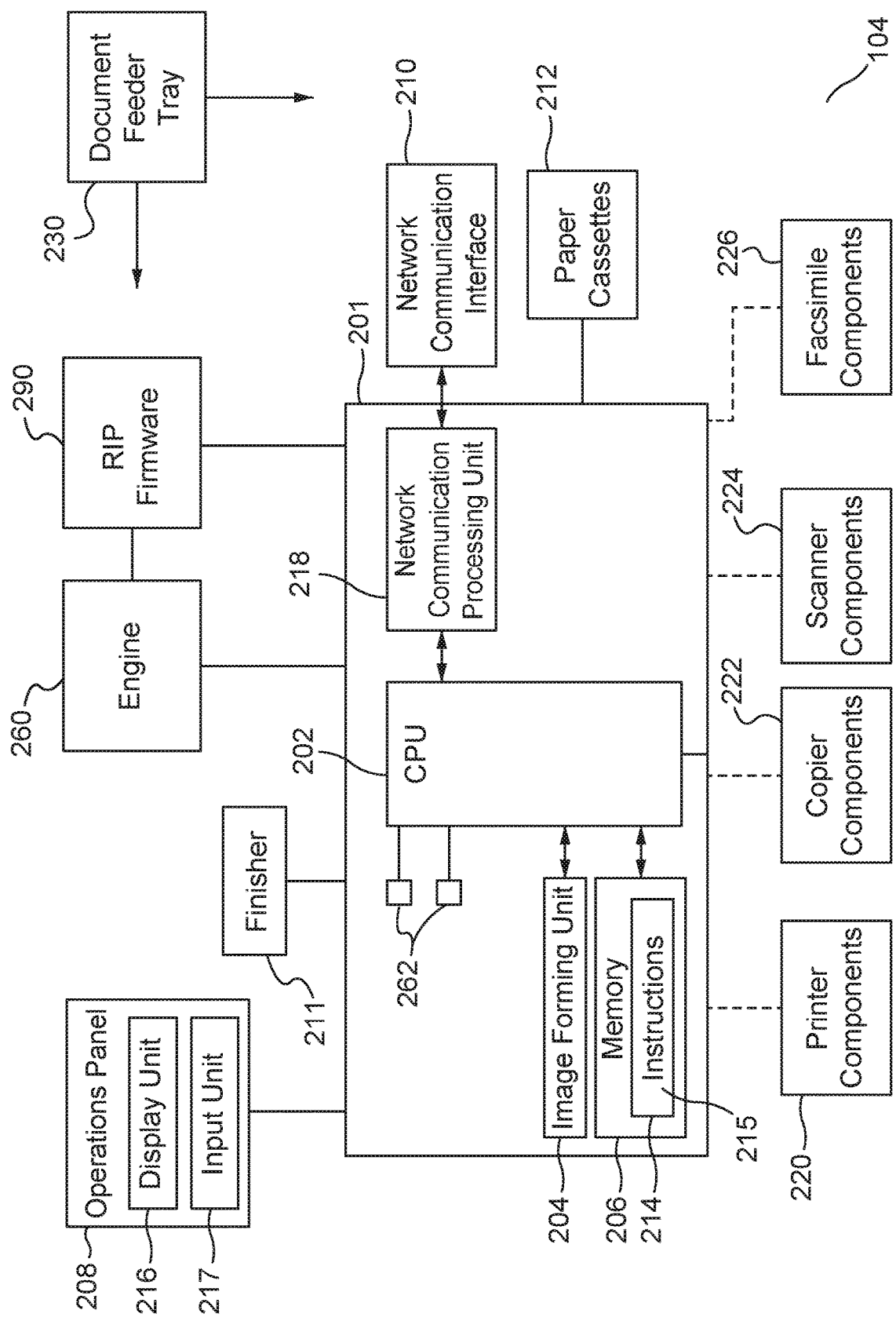
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or mobile device 106, server 108, and computing device 110. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code. Sensors 262 differ from sensor 122 shown in FIG. 1.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with mobile device 106 via network communication interface 210 by utilizing a network protocol, such as the ones listed above. In some embodiments, printing device 104 communicates with server 108 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from mobile device 106, server 108, and computing device 110.

Referring back to FIG. 1, main unit 104A and modules 104B, 104C, and 104D may house different components of printing device 104 shown in FIG. 2. For example, main unit 104A may include engine 260, computing platform 201, RIP firmware 290, image forming unit 204, and memory 206. Operations panel 208 may be connected to main unit 104A. Module 104B may include printer components 220 and scanner components 224 along with paper cassettes 212. Module 104C may include copier components 222 and facsimile components 226 along with its own paper cassettes 212. Module 104D may include finisher 211 as well as consumables used to finish print jobs.

Operations panel 208 may display the primary user interface used to interact with the operator in performing operations. The operations panel may display information as instructed by the program executed to configure and execute the primary user interface. Thus, instructions 214 may include those used to configure and enable the primary user interface on printing device 104 and operations panel 208. The instructions may be stored in memory 206 at main unit 104A and executed by CPU 202. The generation of elements 118 also may occur within computing platform 201 based on items displayed on operations panel 208 related to the primary user interface. These features are disclosed in greater detail below.

Figure 3:
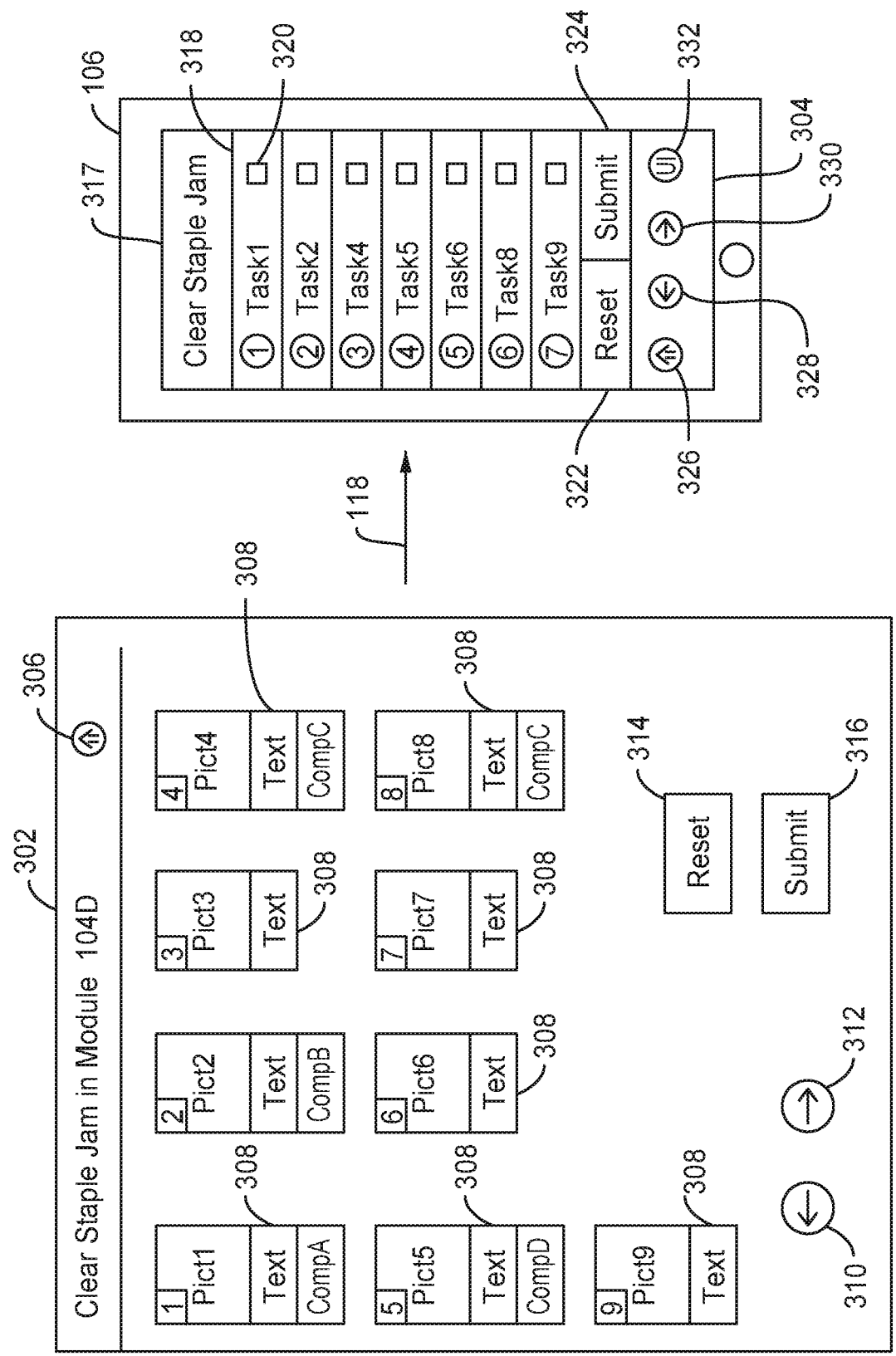
FIG. 3 illustrates a primary user interface and a mobile user interface according to the disclosed embodiments.
Figure 4:
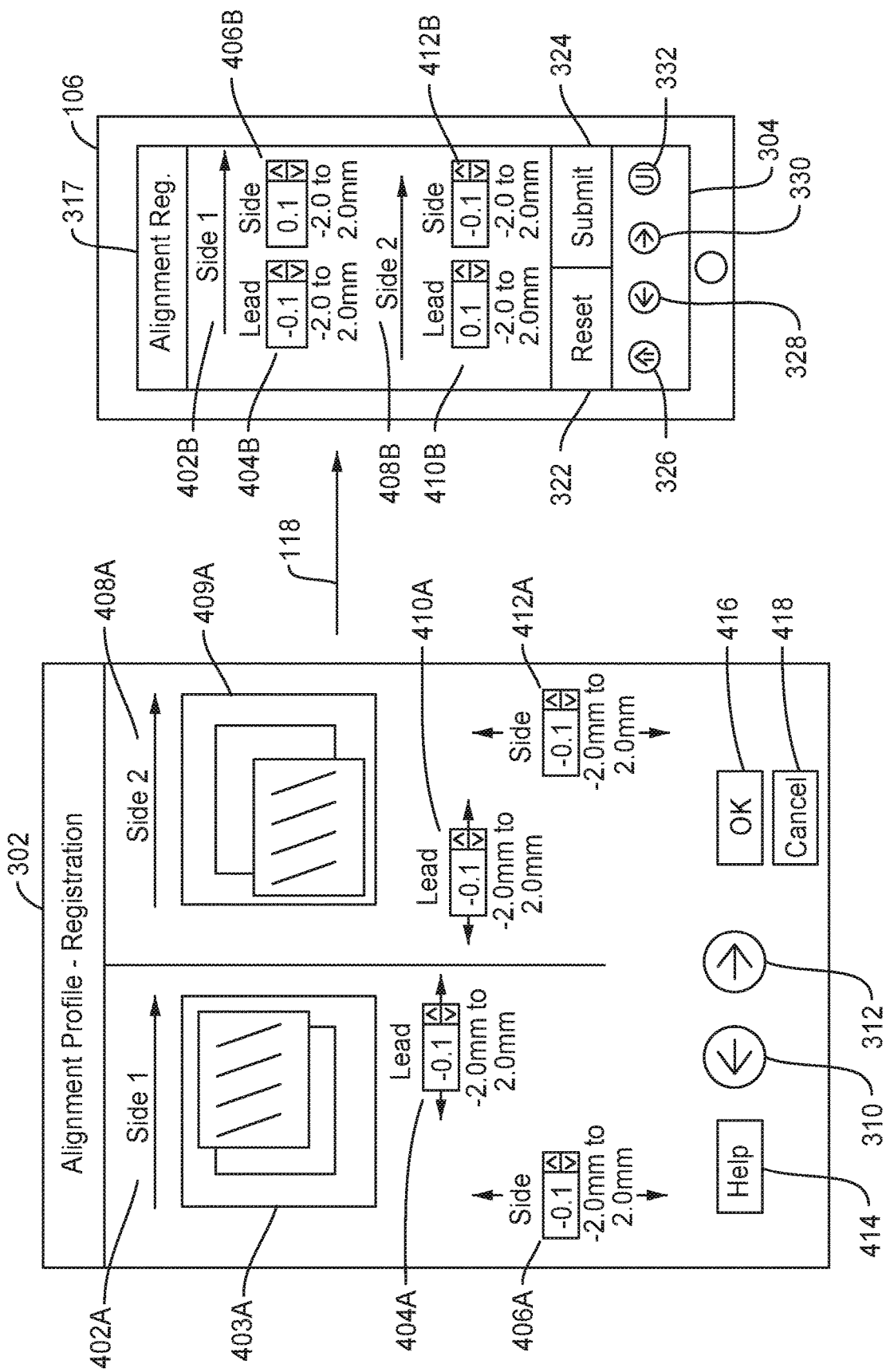
FIG. 4 also illustrates the primary user interface and the mobile user interface according to the disclosed embodiments.

FIGS. 3 and 4 depict a primary user interface 302 and a mobile user interface 304 according to the disclosed embodiments. FIGS. 3 and 4 show example embodiments of identifying a plurality of elements 118 within primary user interface 302 that are exported to mobile device 106 to configure mobile user application 304. The exportation of select information and actions from primary user interface 302 to mobile user interface 304 gives the operator the ability to dismiss confirmation dialogs, change simple settings, or resume printing without having to walk back to panel 208.

Unlike fully remove user interface solutions, mobile user interface 304 is specifically designed to work mobile devices with small screens. The use case is focused on streamlining interactions with panel 208 that would require the operator to move back and forth between a module of printing device 104 and main unit 104A. This feature may allow operators to be more efficient as they can readily dismiss dialogs or make selections without repeated trips back to interact with primary user interface 302. Some production printing devices may be over 10 meters in length. Others may be two stories tall. In these cases, the trip between a module and panel 208 may take significant time.

Mobile user interface 304 allows the operator to provide the input that is typically required for performing certain operations and tasks on a printing device, especially one used for production printing. Mobile user interface 304 may not be separately built or developed. Instead, the mobile user interface is built dynamically from primary user interface 302 as displayed in panel 208.

The configuration of mobile user interface 304 on mobile device 106 may occur according to different embodiments. For example, elements in primary user interface 302 displayed on panel 208 may be tagged in sequence, for example, by the operator. The tagged elements then are exported to mobile application 107, where they may be dynamically stacked. This feature may be common for responsive user interfaces. The tagged elements may be stored at printing device 104 for recall if needed later for similar operations.

Alternatively, if the operations involve service or user interface for operator actions, such as resolving paper jams or replacing consumables, elements 118 may be exported as a list of steps. The instructions and graphics within primary user interface 302 may be detailed. The disclosed embodiments, however, may export just a list of actions that must be performed in sequence. Baffles, knobs, and other components of printing device 104 often are labeled in production printing devices. As such, primary user interface 302 may have small portions that are tagged for export to a list in mobile user interface 304. Primary user interface 302 may show pictures or graphics while mobile user interface 304 may just utilize the user interface title thereby letting the operator the tasks to accomplish.

Rather than generating two sets of user interfaces, primary user interface 302 would be configured to export a subset of its elements into mobile user interface 304, which is dynamically assembled for the operator. Mobile user interface 304 preferably contains the essentials for an operator that is familiar with printing device 104 in that the operator does not need the very detailed information provided by primary user interface 302. These features would allow the seasoned operator to perform the operations without having to return to panel 208. Primary user interface 302 and mobile user interface 304 may be conjoined so that these components remain in sync as the operator progresses through a procedure. This feature would allow the operator to go back and forth between user interfaces, if needed, such as when the operator may need to return to panel 208 to see the details in primary user interface 302.

Mobile user interface 304 may allow the operator to input confirmation that steps are complete. In addition, mobile user interface 304 could allow the operator explicitly to trigger resumption of production or the execution of steps that, for safety reasons, require the operator to initiate the operation. Mobile user interface 304 may populate any field in which maintenance or service of a device requires the operator to reference a user interface with detailed instructions that may be well known to an experienced technician but required for an inexperienced one. The disclosed embodiments apply to those instances that device maintenance or repair require use of an interface. Thus, printing device 104 should be large enough that an operator may not have access to the entire device while in front of primary user interface 302.

Referring to FIG. 3, primary user interface 302 displays tasks 1-9 for clearing a staple jam in module 104D of printing device 104. Each task entry shown in primary user interface 302 may include a picture or graphic as well as text 308 that describes the actions to be taken to complete the associated task. If applicable, then a component within module 104D is listed with the appropriate task. As disclosed above, baffles, knobs, and the like may be tagged in module 104D that then are shown in primary user interface 302. Primary user interface 302 also may include back directional button 310 and forward directional button 312 to move between screens displayed on panel 208. It also includes a reset button 314 and a submit button 316. Submit button 316 may be used to indicate that the tasks are complete and the staple jam cleared. A home button 306 may return primary user interface 302 to a home page or away from the current operation page.

Tasks 1-9 may act as elements to be used to configure mobile user interface 304. Each task includes a picture that shows the action to be done as well as any components on printing device 104. As tasks are completed, the respective picture may be altered or shaded to indicate it is done. Text 308 for each task include instructions on completing the task.

For example, task 1 may include picture 1 and text 308 that instructs the operator to open the front cover of finisher 211 and pull a handle, listed as component A, and pull out the staple unit. Task 2 may include picture 2 and text 308 that instructs the operator to turn a knob, listed as component B, counterclockwise to rotate the staple unit. Task 3 may include picture 3 and text 308 that instructs the operator to pull out the cartridge lever. Task 4 may include picture 4 and text 308 that instructs the operator pull out the cartridge, listed at component C, gently.

With the cartridge, or component C, out of module 104D, task 5 may include picture 5 and text 308 that instructs the operator to open the face plate, listed as component D, of the cartridge. Task 6 may include picture 6 and text 308 that instructs the operator to remove jammed staples. Task 7 may include picture 7 and text 308 that instructs the operator to pull down the face plate until it clicks. Task 8 may include picture 8 and text 308 that instructs the operator to hold the cartridge lever and then push in the cartridge, listed as component C. Thus, the cartridge is referenced in more than one task. Task 9 may include picture 9 and text 308 that instructs the operator to push the cartridge until it clicks, return the staple unit to its original position, and close the finisher front cover.

The tasks shown in primary user interface 302 may become the elements that are used to configure mobile user interface 304. Thus, tasks may be tagged to export as elements 118 to mobile device 106. As disclosed above, the tagging may occur by the operator selecting those tasks to be displayed on mobile device 106 for completion of clearing a staple jam. For example, when mobile application 107 is activated, the operator may tag tasks on panel 208 that are then exported to mobile application 107 to configure mobile user interface 304 with the selected tasks.

Alternatively, computing platform 201 of printing device 104 may execute a process to selected elements 118 to be sent to mobile device 106. The process may select those tasks having instructions referencing specific components, such as components A-D, of printing device 104. The process also may select tasks based on the action taken, such as removing or opening a component within printing device 104. Similar task may be combined based on the text analyzed by the disclosed process. For example, tasks 3 and 4 related to removing the cartridge. It may be apparent to a seasoned operator to pull out the cartridge lever. Thus, this task may not be selected as an element 118 to be exported. Task 7, likewise, may be identified as well-known or redundant in that the operator would know to pull down the face plate to place the cartridge back in to printing device 104.

Tagged or identified elements 118 are exported to mobile device 106. Mobile application 107 configures mobile user interface 304 using received elements 118. Mobile user interface 304 includes a title field 317 that describes the operation being done on printing device 104. Here, title field 317 displays "Clear Staple Jam" which corresponds to what is displayed by primary user interface 302, except the title may be shortened to accommodate the screen of mobile device 106.

Task list 318 includes the tasks corresponding to elements 118 identified at primary user interface 302. As shown, tasks 1, 2, 4, 5, 6, 8, and 9 were selected as elements 118 and received by mobile application 107. Mobile application 107 configures mobile user interface 304 based on these elements. Thus, titles for the tasks are listed as tasks to be completed in task lit 318. Entries for task list 318 also include buttons 320 that the operator may engage to show that a task is complete. Referring to FIG. 3, tasks 3 and 7 are not listed in task list 318. Thus, the disclosed embodiments may reduce or increase the tasks to be completed at mobile user interface 304. In other words, mobile user interface 304 is configured dynamically as opposed to just mirroring what is provided in primary user interface 302.

Task list 318 also allows the tasks for the operation to be done to fit on a mobile device, which has less screen area than panel 208. Further, as disclosed above, the operator may not need the all of the information provided by primary user interface 302 to update completion of tasks while away from panel 208. The operator may engage an entry of task list 318 that will send him/her to another page with more detailed description of the task to be accomplished. For example, if the operator presses the entry for task 6, then another page may launch that displays picture 6 and text 308 detailing what is to be done before the task is completed.

Mobile user interface 304 also includes various buttons for operations similar to those shown on primary user interface 302. It may include a reset button 322 and submit button 324. Submit button 324 may be engaged when all tasks listed for the operation are completed. Home button 326 and directional buttons 328 and 330 may serve the same functions as their counterpart buttons on primary user interface 302. Mobile user interface 304 also may include a user interface button 332, which toggles the information display on mobile device 106 with information displayed on panel 208. In other words, the operator may access the displayed information on primary user interface 302.

In some embodiments, button 326 may serve as a resume button in that the operator may instruct printing device 104 to resume printing after the operation or tasks are complete. For example, after clearing the staple jam, the operator may press button 326 to resume printing operations without having to walk back to panel 208 or main unit 104A.

FIG. 4 depicts another example of mobile user interface 304 being configured by elements 118 exported from primary user interface 302. Primary user interface 302 may display a page or screen related to an alignment profile pertaining to registration. Title field 317 of mobile user interface 304 includes a title corresponding to the information provided in primary user interface 302 but shortened to fit on the screen of mobile device 106.

Primary user interface 302 may show instructions, or tasks, to accomplish in doing the alignment profile. Task 402A may pertain to entering information from the alignment for side 1 of a paper. Graphic 403A may show how to complete the task and where to align the paper. Entry boxes 404A and 406A may be used to enter measurements or values related to the alignment process. Entry box 404A may receive a lead value and includes buttons to increase or decrease the value within the entry box. Entry box 406A may receive a side value and also includes buttons to increase or decrease the value within the entry box.

Task 408A may pertain to entering information from the alignment for side 2 of the paper. Graphic 409A may show how to complete task 408A and where to align the paper. Lead entry box 410A and side entry box 412A provide the means to enter values for these positions. Primary user interface 302, therefore, is asking for information to be entered as opposed to tasks to be completed. The disclosed embodiments configure mobile user interface 304 based on this information.

Primary user interface 302 also includes a help button 414, directional buttons 310 and 312, an "OK" button 416, and a cancel button 418. OK button 416 may store the results entered into primary user interface 302 at printing device 104. Cancel button 418 may terminate the operation for the alignment profile.

The disclosed embodiments identify elements 118 from primary user interface to export to mobile device 106. In this example, the operator may not need graphics 403A and 409A to show how to align the paper to take the measurements. The operator already understands the alignment process. Thus, mobile application 107 configures mobile user interface to not include graphics 403A and 409A. Further, use of graphics in mobile user interface 304 may be unwieldy or may clutter the screen.

Again, the operator may tag the elements to be sent to mobile device 106 or a process may be executed by printing device 104 to identify those items of primary user interface 302 to send to mobile device 106. Task 402B corresponds to task 402A, or the measuring of side 1 of the paper. Lead entry box 404B and side entry box 406B are similar to entry boxes 404A and 406A. The operator may need to enter the exact information for the alignment operation so that these boxes are configured in their entirety in mobile user interface 304 as opposed to abbreviated versions thereof. Task 408B corresponds to task 408A, or the measuring of side 2 of the paper. Task 408B also includes lead entry box 410B and side entry box 412B to enter values for these measurements into mobile user interface 304. The operator may adjust the values in boxes 404B, 406B, 410B, and 412B using the buttons at the side of the boxes, much like the ones also used in primary user interface 302.

The operator may tag elements 118 from items shown on primary user interface 302. The operator may understand that he/she only needs the task and entry boxes to complete alignment. The operator engages the items on panel 208 by pressing on the item then exports the selected items as elements 118. Alternatively, the process executed by printing device 104 may determine that only entry boxes are needed for mobile user interface 304 and, therefore, selects these as elements 118. Graphics are not selected due to the restrictions placed on displaying them on mobile device 106. The operator, however, may use buttons on mobile user interface 304 to access more detailed information, if needed.

Figure 5:
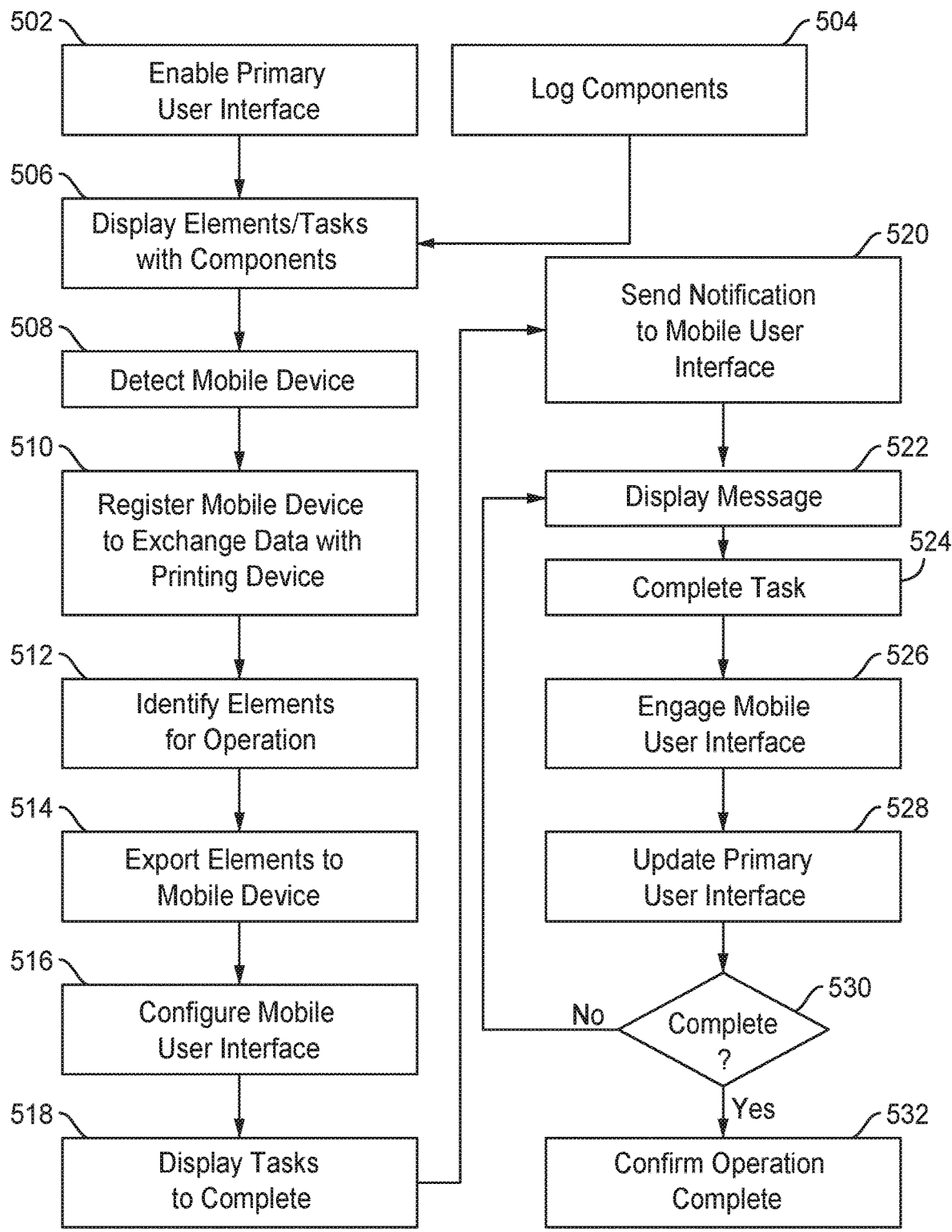
FIG. 5 illustrates a flowchart for using a mobile user interface in conjunction with a primary user interface according to the disclosed embodiments.

FIG. 5 depicts a flowchart 500 for using mobile user interface 304 in conjunction with primary user interface 302 at printing device 104 according to the disclosed embodiments. The disclosure of flowchart 500 may refer to FIGS. 1-4 for illustrative purposes. The embodiments disclosed by flowchart 500, however, are not limited by the features of FIGS. 1-4.

Step 502 executes by enabling primary user interface 302 at panel 208 of printing device 104. Printing device 104 executes processes to display primary user interface 302 and perform actions related to the operator interacting with the printing device. The operator may input data, view messages, and retrieve information using primary user interface 302. Step 504 executes by logging components in printing device 104 with primary user interface 302 so that the components may be referenced as needed. Referring to FIG. 3 above, components A, B, C, and D may refer to physical components within module 104D of printing device 104. Components tagged may include baffles, knobs, cartridges, levers, and other printing device components that are labeled, especially in maintenance or recovery operations. Primary user interface 302 may identify these labeled components to log for display in tasks to complete an operation. Steps 502 and 504 may execute simultaneously or in any order. Flowchart 500 proceeds from both steps to step 506.

Step 506 executes by displaying elements or tasks with appropriate components to complete one or more operations on panel 208. Depending on the operation to complete, information is displayed using primary user interface 302. The information may be tasks to complete or entry boxes to submit data. Preferably, tasks are displayed that are related to the elements used to configure mobile user interface 304. Tasks, as disclosed above, may include pictures or graphics as well as text to explain how to complete the tasks. The tasks serve to perform an operation at printing device 104.

Step 508 executes by detecting mobile device 106 by printing device 104. Sensor 122 may detect the presence of a mobile device. Alternatively, mobile device 106 may send a request to printing device 104 to register it with the printing device. The operator may input information related to mobile device 106 on panel 208 through primary user interface 302. Step 510 executes by registering mobile device 106 to exchange data with printing device 104. Step 510 enables mobile device 106 to receive notifications from printing device 104. As disclosed above, this enablement may occur in different ways. Mobile application 107 may receive notifications automatically from nearby printing devices using a short-range communication protocol. Alternatively, the operator may scan a graphical code 116, such as a QR code, to inform printing device 104 to send notifications to mobile device 106. For example, printing device 104 may scan a code displayed on mobile device 106 to determine an address to send notifications. Mobile device 106 may scan a code at printing device 104, possibly displayed on panel 208, to send a request to enable receipt of notifications from the printing device.

Step 512 executes by identifying elements 118 of primary user interface 302 related to the operation displayed on panel 208. Primary user interface 302 displays an operation to complete at printing device 104. As disclosed above, an operation, such as clearing a staple jam or an alignment, will include tasks to complete. These tasks may correspond to elements 118 that are identified by the operator or a process executed by printing device 104 to enable execution of the operation on a mobile device. The operator may tag or engage tasks display through primary user interface 302 for export. The process may identify elements 118 be selecting those tasks citing a component or action to complete within the operation.

Step 514 executes by exporting elements 118 to mobile device 106 and mobile application 107. Printing device 104 may push elements 118 as data to mobile device 106. Alternatively, elements 118 may be loaded to mobile application 107 from printing device 104. Step 516 executes by configuring mobile user interface 304 according to elements 118 exported from the primary user interface. Mobile user interface 304 may remove extraneous material, such as pictures or graphics, text, links, and the link then display tasks to be completed based on elements 118. Mobile user interface 304 may be configured to include entry boxes, buttons, and other input fields if the tasks call for the input of data to complete the operation. It also may include buttons showing that a task is complete. All of these features of mobile user interface 304 correspond to elements 118 identified from the operation and tasks provided by primary user interface 302.

Step 518 executes by displaying the tasks to complete and other information using mobile user interface 304 on mobile device 106. Messages may be displayed using mobile user interface 304. The messages may include instructions to the operator or action buttons to complete the tasks associate with the messages. Referring to FIG. 3, buttons 320 may be engaged when a task is complete. Referring to FIG. 4, submit button 324 may be engaged when the data is entered into the entry boxes.

Step 520 executes by sending a notification 119 to mobile user interface 304 corresponding to the operation. When the user is to perform an operation that requires input or confirmation, the disclosed embodiments will not only display this feature in primary user interface 302 but it also will send notification 119 to mobile device 106. Notification 119 may notify the operator that the operation needs to be completed and instruct mobile application 107 to launch mobile user interface 304.

Step 522 executes by displaying a message related to a task to complete to perform the operation. Step 524 executes by completing the task at printing device 104 according to the message displayed on mobile user interface 304. Step 526 executes by engaging mobile user interface 304 to indicate that the task is complete. Step 528 executes by updating primary user interface 302 with the information and data input to mobile user interface 304. Step 530 executes by determining whether the operation is complete, or if additional tasks or messages need to be addressed. If no, then flowchart 500 returns to step 522 to complete the additional tasks. If step 530 is yes, then step 532 executes by confirming the operation is complete using mobile application 107 and to primary user interface 302. The operator may instruct printing device 104 to resume printing operations or to come back online.

In some embodiments, printing system 100 may enable further operations to account for delays or error conditions in completing tasks using mobile user interface 302. Primary user interface 302 may determine an amount of time has passed since sending notification 119 to mobile device 106 with no response. For example, primary user interface 302 has not received confirmation of receipt of notification 119, or that any data has been received that a task is completed for the operation displayed by mobile user interface 304. In this instance, primary user interface 302 may resend notification 119. The disclosed embodiments also may detect an error condition within printing device 104 that pre-empts the operation displayed and enabled by mobile user interface 304. Notification 119 may be sent to mobile device to configure mobile user interface 304 in response to the error condition along with elements 118 from primary user interface 302 related to the error condition.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specific the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for using a mobile user interface with a primary user interface for a printing device, the method comprising:
    enabling the primary user interface at a panel at the printing device, wherein the printing device includes a main unit and at least one module physically separate from the main unit;
    logging physical components of the printing device with the primary user interface wherein the physical components are located on the main unit and the at least one module;
    displaying an operation to complete at the printing device in the primary user interface;
    receiving an input to identify a first plurality of elements displayed in the primary user interface related to the operation to complete, wherein the operation is completed according to the first plurality of elements of the primary user interface using the physical components;
    exporting the first plurality of elements to a mobile device connected to the printing device, wherein the mobile device includes the mobile user interface;
    configuring the mobile user interface to display a second plurality of elements, wherein the second plurality of elements corresponds to the first plurality of elements identified at the primary user interface and wherein the second plurality of elements differ visually from the first plurality of elements;
    sending a notification to the mobile user interface corresponding to the operation;
    displaying a message in response to the notification within the mobile user interface; and
    engaging the mobile user interface to indicate that the operation is complete on the printing device.

2. The method of claim 1, wherein identifying the first plurality of elements includes a subset of elements to complete the operation.

3. The method of claim 1, further comprising enabling the mobile device to receive the notification from the printing device.

4. The method of claim 3, wherein enabling the mobile device includes using a mobile application on the mobile device to receive the notification.

5. The method of claim 3, further comprising scanning a code for the printing device to configure the printing device to communicate with the mobile device.

6. The method of claim 1, further comprising generating the operation to complete based upon a condition for a component of the components within the printing device.

7. The method of claim 1, wherein the notification corresponds to a status of the printing device.

8. The method of claim 1, further comprising generating the notification in response to a displayed graphic within the primary user interface.

9. A method for performing operations at a printing device, the method comprising:
    registering a mobile device with the printing device, wherein the printing device includes a main unit and at least one module physically separate from the main unit;
    logging physical components of the printing device with a primary user interface, wherein the physical components are located on the main unit and the at least one module;
    selecting a first plurality of elements displayed on the primary user interface running on a panel at the printing device, wherein the first plurality of elements relates to tasks to complete using the physical components on the printing device;
    exporting the first plurality of elements to a mobile user interface on the mobile device;
    configuring the mobile user interface according to the first plurality of elements to display a second plurality of elements, wherein information displayed by the mobile user interface corresponds to the first plurality of elements from the primary user interface and wherein the second plurality of elements differ visually from the first plurality of elements;
    receiving a notification at the mobile device from the printing device;
    prompting a task shown by one of the second plurality of elements to complete at the printing device using the mobile user interface based on the notification;
    receiving an input at the mobile user interface regarding the task; and updating the first plurality of elements at the primary user interface based on the input.

10. The method of claim 9, wherein, if the task is not complete, further comprising resending the notification to the mobile device.

11. The method of claim 9, wherein registering the mobile device includes scanning a code for the printing device using the mobile device.

12. The method of claim 9, wherein identifying the first plurality of elements within the primary user interface includes tagging the first plurality of elements as displayed using the primary user interface.

13. The method of claim 9, further comprising exporting a list of components of the printing device to the mobile user interface.

14. The method of claim 13, wherein the list of components is tagged.

15. The method of claim 9, further comprising determining an amount of time has passed since sending the notification; and
resending the notification to the mobile device.

16. The method of claim 9, further comprising detecting an error condition in the printing device; and
sending the notification in response to the error condition.

17. A printing system comprising:
a printing device having a panel for a primary user interface, wherein the printing device includes a main unit and at least one module physically separate from the main unit, the printing device also having physical components located on the main unit and the at least one module, and wherein the primary user interface displays a first plurality of elements related to an operation to complete using the physical components on the printing device; and
a mobile device connected to the printing device, wherein the mobile device includes a mobile application to support a mobile user interface,
wherein the primary user interface is configured to receive an input to identify the first plurality of elements,
wherein the primary user interface is configured to export the first plurality of elements identified by the primary user interface to the mobile user interface,
wherein the mobile user interface is configured to
display a second plurality of elements that corresponds to the first plurality of elements from the primary user interface and wherein the second plurality of elements differ visually from the first plurality of elements,
display messages from the primary user interface on the mobile device that correspond to the second plurality of elements,
receive a notification at the mobile device from the printing device,
prompt a task to complete at the printing device using the mobile user interface based on the notification,
receive an input at the mobile user interface regarding the task, and
update the primary user interface based on the input.

18. The printing system of claim 17, wherein the printing device is configured to detect an error and update the primary user interface in response to the error.

19. The printing system of claim 18, wherein the primary user interface is configured to generate the notification in response to the error.

20. The printing system of claim 17, wherein the mobile device is configured to scan a code for the printing device to enable communications between the primary user interface and the mobile user interface.

* * * * *